United States Patent

Yamaguchi et al.

Patent Number: 5,840,208
Date of Patent: Nov. 24, 1998

[54] LIQUID CRYSTAL COMPOSITION AND LIQUID CRYSTAL DISPLAY ELEMENT

[75] Inventors: Takashi Yamaguchi; Katsuyuki Murashiro; Fusayuki Takeshita; Tetsuya Matsushita; Etsuo Nakagawa, all of Chiba, Japan

[73] Assignee: Chisso Corporation, Osaka-fu, Japan

[21] Appl. No.: 812,956

[22] Filed: Mar. 5, 1997

[30] Foreign Application Priority Data

May 8, 1996 [JP] Japan .................................. 8-139442

[51] Int. Cl.⁶ ........................ C09K 19/30; C09K 19/32; C09K 19/34; C09K 19/12
[52] U.S. Cl. ............................ 252/299.63; 252/299.62; 252/299.61; 252/299.66
[58] Field of Search ................... 252/299.61, 299.63, 252/299.66, 299.62

[56] References Cited

U.S. PATENT DOCUMENTS

| | | | |
|---|---|---|---|
| 4,797,228 | 1/1989 | Goto et al. | 252/299.63 |
| 4,886,421 | 12/1989 | Sage et al. | 252/299.61 |
| 4,917,819 | 4/1990 | Goto et al. | 252/299.63 |
| 5,102,577 | 4/1992 | Uchida et al. | 252/299.01 |
| 5,122,295 | 6/1992 | Weber et al. | 252/299.01 |
| 5,308,538 | 5/1994 | Weber et al. | 252/299.61 |
| 5,439,613 | 8/1995 | Takeshita et al. | 252/299.63 |
| 5,560,865 | 10/1996 | Nakagawa et al. | 252/299.01 |
| 5,650,093 | 7/1997 | Hachiya et al. | 252/299.63 |

*Primary Examiner*—C. H. Kelly
*Attorney, Agent, or Firm*—Wenderoth, Lind & Ponack, L.L.P.

[57] ABSTRACT

A chiral nematic liquid crystal composition which has a broad d/P margin, particularly for corresponding to a large size of LCD panel, while satisfying various characteristics sought for STN display mode, and which contains as a first component, at least one member of compounds expressed by the formulas (I-a) to (I-d); as a second component, at least one member of compounds expressed by the formulas (II) to (V); and as a third component, cholesteryl nonanoate,

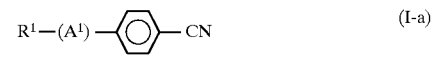
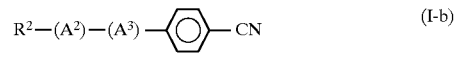
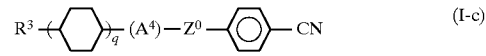
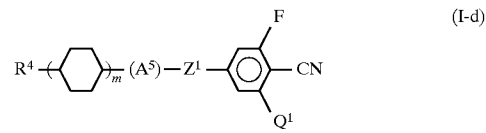
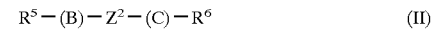
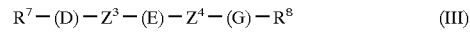
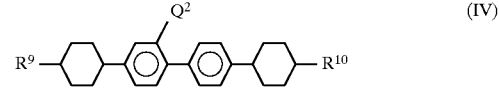
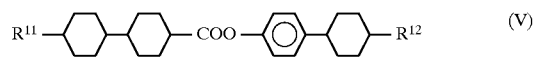

wherein the substituents are described herein.

8 Claims, No Drawings

LIQUID CRYSTAL COMPOSITION AND LIQUID CRYSTAL DISPLAY ELEMENT

BACKGROUND OF THE INVENTION

1. Field of the Invention

This invention relates to a nematic liquid crystal composition and more particularly, it relates to a nematic liquid crystal composition containing a chiral component which is preferable for super-twisted birefringence (STN) mode and a liquid crystal display element composed using the same.

2. Description of the Related Art

Liquid crystal display element (LCD) has been obtained by sealing a liquid crystal composition in a closed cell formed between two sheets of substrates. This LCD not only has a lower electric power consumption, but also can be made into a smaller size and is light-weight, as compared with CRT (Braun tube mode display); hence it has been successfully used practically for various modes such as twisted nematic (TN) mode, super-twisted nematic (STN) mode, active matrix (AM) LCD mode or the like.

Among these modes, STN mode having the molecular alignment of liquid crystals sealed in the upper and lower substrates, twisted by 180° to 270°, proposed by T. J. Scheffer et al. (Appl. Phys. Lett., 45 (10), 1021 (1984)), has been very often used particularly for use applications such as personal computer, word processors, etc.

For the liquid crystal compositions used for STN mode LCD, the following characteristics have been generally sought:

(1) nematic liquid crystal phase of the composition is exhibited within a broad temperature range including room temperature and particularly the nematic-isotropic phase transition point (clearing point) is high;

(2) in order to make the electric power consumption of a liquid crystal display element smaller, the threshold voltage is made lower;

(3) the response time ($\tau$) of a liquid crystal element is improved as much as possible ($\tau$ is made lower); hence the viscosity ($\eta$) of the composition is kept low;

(4) in accordance with the liquid crystal display element, an adequate optical anisotropy ($\Delta n$) of the composition can be taken; and (5) in order to elevate the contrast of the liquid crystal display element, the steepness of voltage-transmittance characteristic of the composition is desired, and thereby the value of ($V_{10}/V_{90}$) is reduced.

Further, in the STN cell wherein the liquid crystal composition is sealed, there is a problem that if the twist pitch length P ($\mu$m) relative to the cell thickness (d) is too long (that is, the value of d/P becomes smaller than the predetermined value), the twist of liquid crystals becomes discontinuous and the so-called low dimensional domain (reverse domain) occurs, and on the contrary, if P becomes too short, the twist axis of liquid crystals largely deviates from the thickness direction of the cell and the so-called stripe domain occurs.

Accordingly, even if the d value is somewhat changed, a liquid crystal composition having a broad range of d/P (d/P margin) wherein no domain occurs, has been sought.

In recent years, particularly, it has been desired to increase the size of LCD in order to spread their use to note-type personal computers (PC), but the larger the size of the LCD, the more difficult it is to keep d uniform. This fact constitutes a main factor of increasing the proportion of domain-occurring panels during the mass production of liquid crystal panels particularly having STN cell incorporated therein; hence it has become an urgent problem to avoid it. From such a viewpoint, a chiral nematic liquid crystal composition having a broad d/P margin has been strenuously required for the liquid crystal material.

As apparent from the description mentioned below, the liquid crystal composition of the present invention contains compounds expressed by the formulas (1-a) to (1-d) and (II) to (V), respectively as a first component and a second component, and further a chiral component expressed by the formula (X) as a third component. A liquid crystal composition apparently similar thereto has been disclosed in, for example, Japanese patent application laid-open No. Hyo Hei 04-501878.

However, the chiral component (an optically active compound) used in this publication is limited to p-(p-n-hexylbenzoyloxy)benzoic acid-2-octyl ester made by Merck Corporation (trade name: S-811), and such a compound aims at achieving a short switching time, but there is no description as to d/P margin, and in fact, it has a drawback that the range of d/P is narrow.

As described above, liquid crystal composition have been earnestly researched, but the research is not yet sufficient, and it is the present status that improvement in the compositions has been required.

SUMMARY OF THE INVENTION

The object of the present invention is to provide a chiral nematic liquid crystal composition having a broad d/P margin, particularly corresponding to a large size of LCD panel, while satisfying various characteristics required for the above-mentioned STN display mode.

In order to solve this and other objects, the present inventors have strenuously researched a liquid crystal composition using various liquid crystal compounds, and as a result, have achieved the present invention.

The liquid crystal composition of the present invention comprises as a first component, at least one member of compounds expressed by the formulas (I-a) to (I-d):

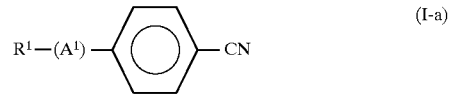

(I-a)

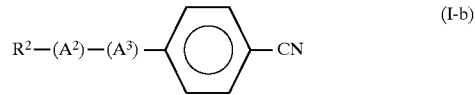

(I-b)

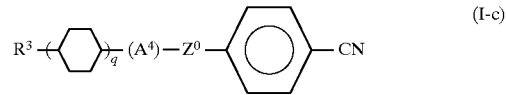

(I-c)

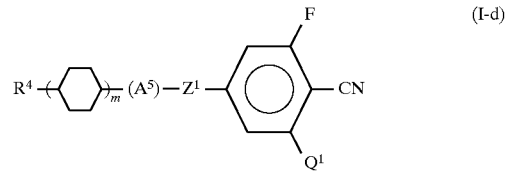

(I-d)

wherein, $R^1$, $R^2$, $R^3$ and $R^4$ each independently represent an alkyl group of 1 to 10 carbon atoms, and optionally one or two or more not-adjacent methylene groups (—$CH_2$—) in the group may be replaced by oxygen atom or —CH=CH—; $Z^0$ represents —COO— or —$CH_2CH_2$—; $Z^1$ represents —$CH_2CH_2$—, —COO— or single bond; $Q^1$ represents H or F;

$A^1$ represents 1,4-cyclohexylene, 1,4-phenylene, 1,3-dioxane-2,5-diyl or 1,3-pyrimidine-2,5-diyl; $A^2$ and $A^4$ each independently represent 1,4-cyclohexylene or 1,4-phenylene; $A^3$ represents 1,4-cyclohexylene, 1,4-phenylene or 1,3-pyrimidine-2,5-diyl;

$A^5$ represents 1,4-cyclohexylene or 1,4-phenylene whose

H on the lateral position may be replaced by F; and q and m each independently represent 0 or 1, as a second component, at least one member of compounds expressed by the formulas (II) to (V)

  (II)

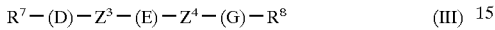  (III)

  (IV)

  (V)

wherein $R^5$ and $R^6$ each independently represent an alkyl group of 1 to 10 carbon atoms and optionally one or two or more not-adjacent methylene groups (—CH$_2$—) in the group may be replaced by oxygen atom or —CH=CH—;

B represents 1,4-cyclohexylene, 1,4-phenylene or 1,3-pyrimidine-2,5-diy; C represents 1,4-cyclohexylene or 1,4-phenylene; and $Z^2$ represents —C≡C—, —COO—, —CH$_2$CH$_2$—, —CH=CH— or single bond, $R^7$ and $R^8$ each independently represent an alkyl group of 1 to 10 carbon atoms and optionally one or two or more not-adjacent methylene groups (—CH$_2$—) in the group may be replaced by oxygen atom (—O—) or —CH=CH—;

D represents 1,4-cyclohexylene or 1,3-pyrimidine-2,5-diyl;

E represents 1,4-cyclohexylene or 1,4-phenylene whose one H on the lateral position may be replaced by F; G represents 1,4-cyclohexylene or 1,4-phenylene; $Z^3$ represents —CH$_2$CH$_2$— or single bond; and $Z^4$ represents —C≡C—, —COO—, —CH=CH— or single bond, $R^9$ to $R^{12}$ each independently represent an alkyl group of 1 to 10 carbon atoms or an alkenyl group of 2 to 10 carbon atoms; and $Q^2$ represents H or F, and as a third component, cholesteryl nonanoate expressed by the formula (X)

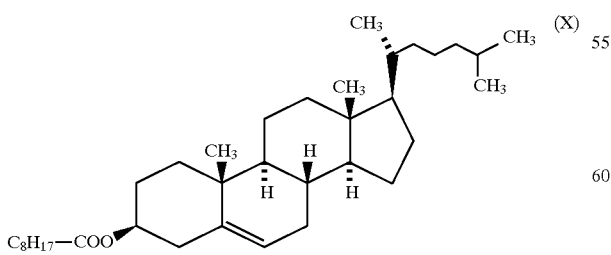  (X)

The liquid crystal composition of the present invention may further contain as a fourth component, at least one member of compounds expressed by the formulas (VI) and/or (VII):

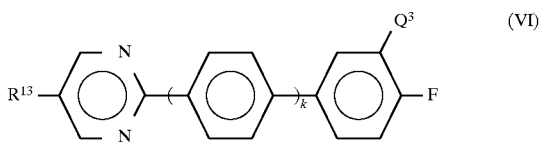  (VI)

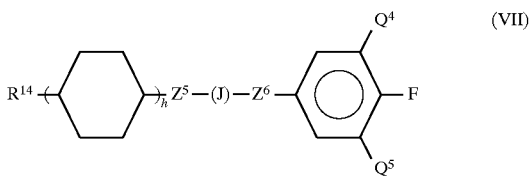  (VII)

wherein $R^{13}$ represents an alkyl group of 1 to 10 carbon atoms or an alkenyl group of 2 to 10 carbon atoms; $Q^3$ represents H or F; and k represent 0 or 1, and $R^{14}$ represents an alkyl group of 1 to 10 carbon atoms or an alkenyl group of 2 to 10 carbon atoms;

J represents 1,4-cyclohexylene or 1,4-phenylene; $Q^4$ and $Q^5$ each independently represent H or F; $Z^5$ and $Z^6$ each independently represent —COO— or single bond; and h represents 0, 1 or 2.

By using these liquid crystal compositions of the present invention, it is possible to obtain liquid crystal display elements satisfying the object of the present invention.

DETAILED DESCRIPTION OF PREFERRED EMBODIMENTS

As preferable examples of the first component used in the liquid crystal compositions of the present invention, compounds respectively expressed by the formulas (I-a-1) to (I-a-6), as regards the formula (1-a), the formulas (I-b-1) to (I-b-4) as regards the formula (I-b), the formulas (I-c-1) to (I-c-5) as regards (I-c), and (I-d-1) to (I-d-11) as regards (I-d), can be mentioned:

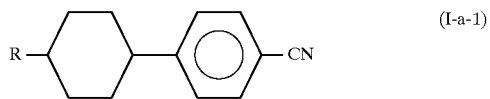  (I-a-1)

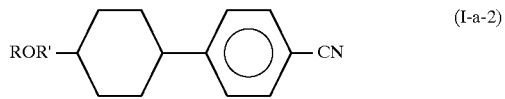  (I-a-2)

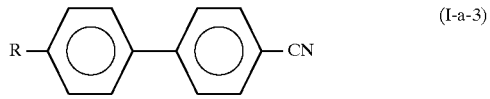  (I-a-3)

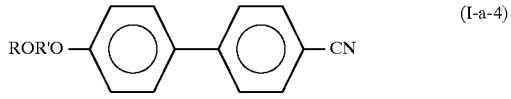  (I-a-4)

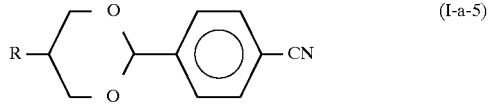  (I-a-5)

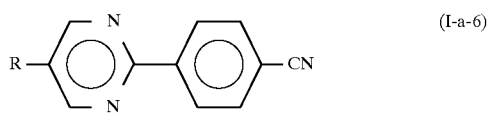  (I-a-6)

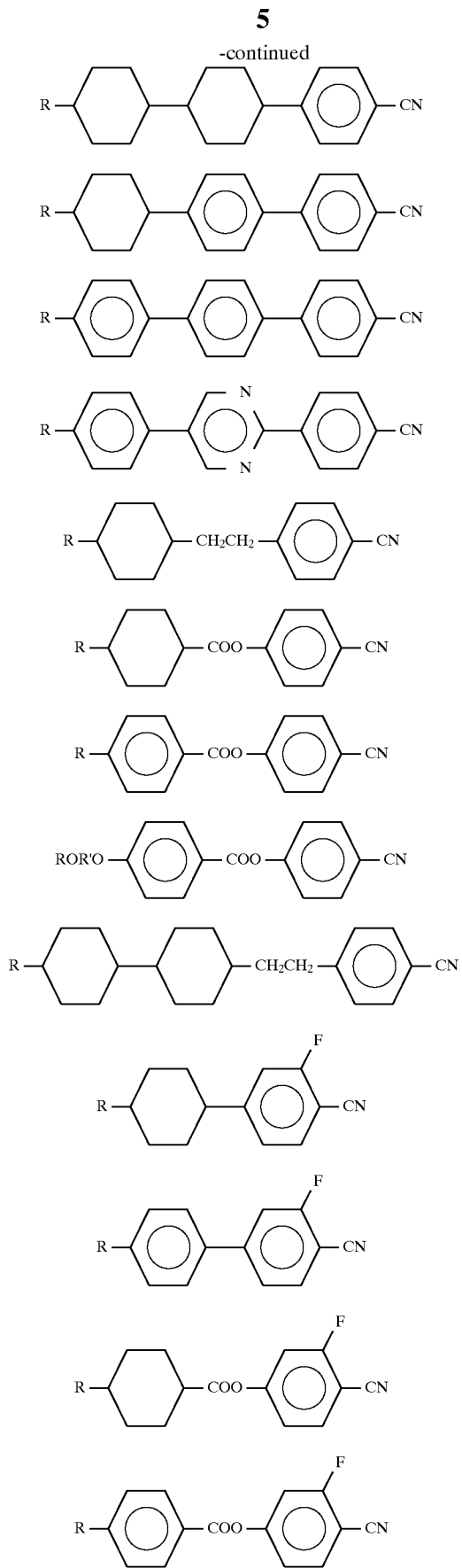
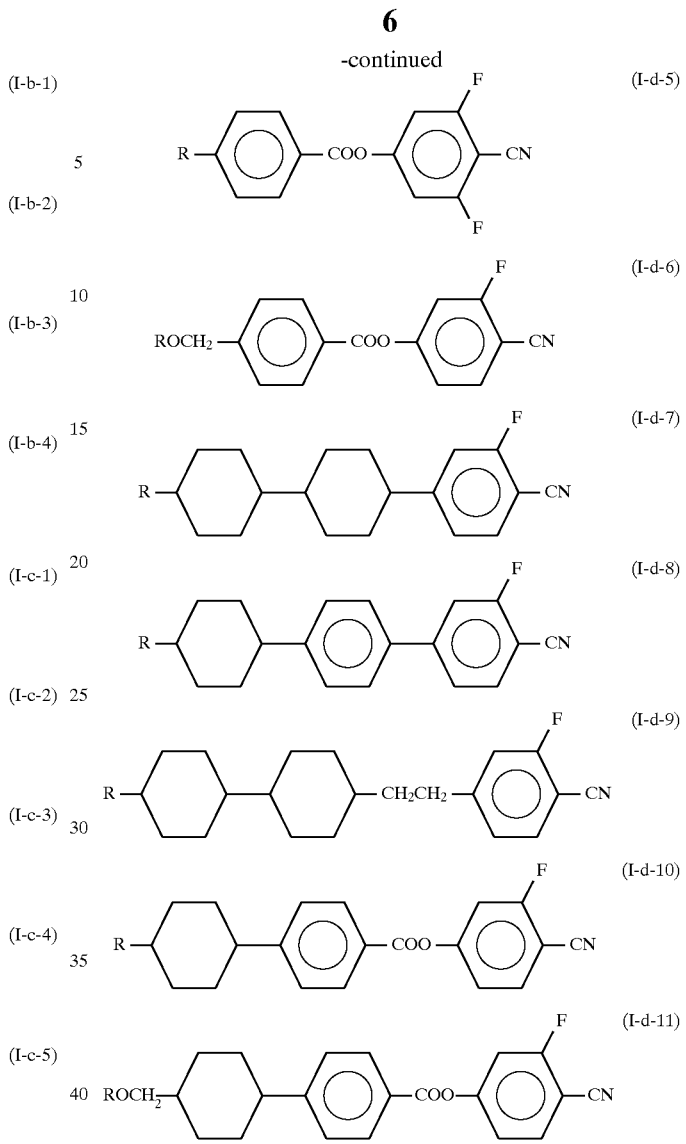

In these formulas, R represents an alkyl group of 1 to 10 carbon atoms or an alkenyl group of 2 to 10 carbon atoms; R' represents an alkanediyl or alkenediyl of 1 to 9 carbon atoms; and the sum of carbon atoms of R and R' is 10 or less.

Among these compounds, particularly those expressed by the formulas (I-a-1), (I-a-2), (I-a-3), (I-a-5), (I-a-6), (I-b-1), (I-b-2), (I-c-1), (I-d-1), (I-d-4), (I-d-5), (I-d-6), (I-d-7), (I-d-10) and (I-d-11) are preferably used.

These compounds of the first component exhibit a positive and large dielectric anisotropy ($\Delta\epsilon$); hence they are used mainly for lowering the threshold voltage ($V_{10}$) and for improving the steepness which are important as STN characteristics.

The content of the first component is 5 to 30% by weight, preferably 10 to 60% by weight based upon the total weight of the liquid crystal composition. If the content is lower than 5% by weight, the liquid crystal composition has a small Vth and the steepness becomes inferior. On the contrary, if it exceeds 80% by weight, the viscosity of the liquid crystal composition becomes high.

Further, as preferable examples of the second component, compounds expressed by the formulas (II-1) to (II-19) as regards the formula (II), the formulas (III-1) to (III-16) as regards the formula (III), the formulas (IV-1) to (IV-2), as regards the formula (IV), and the formula (V-1), as regards the formula (V) can be respectively mentioned.
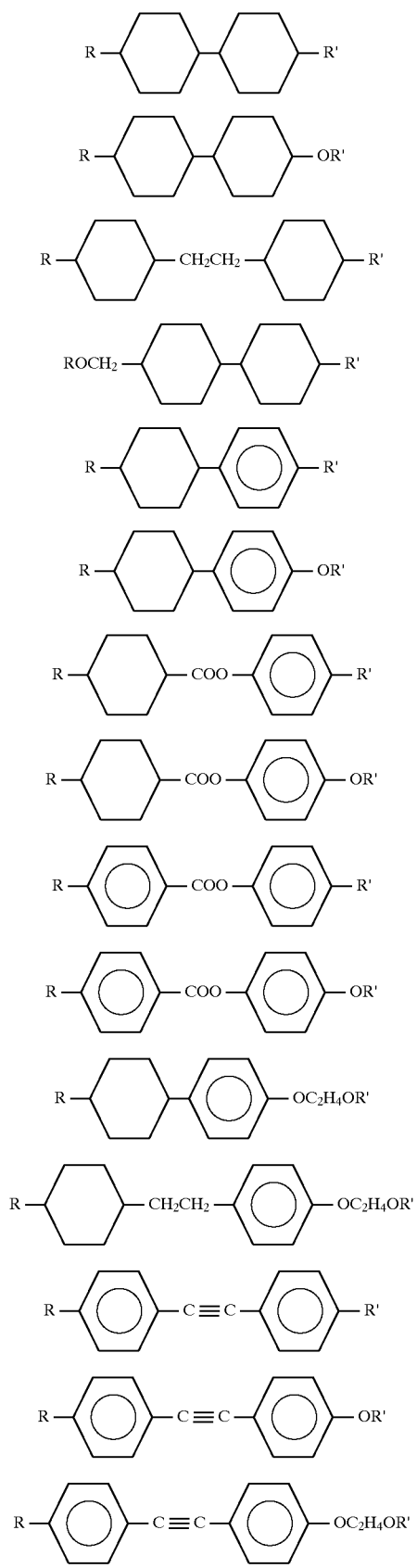
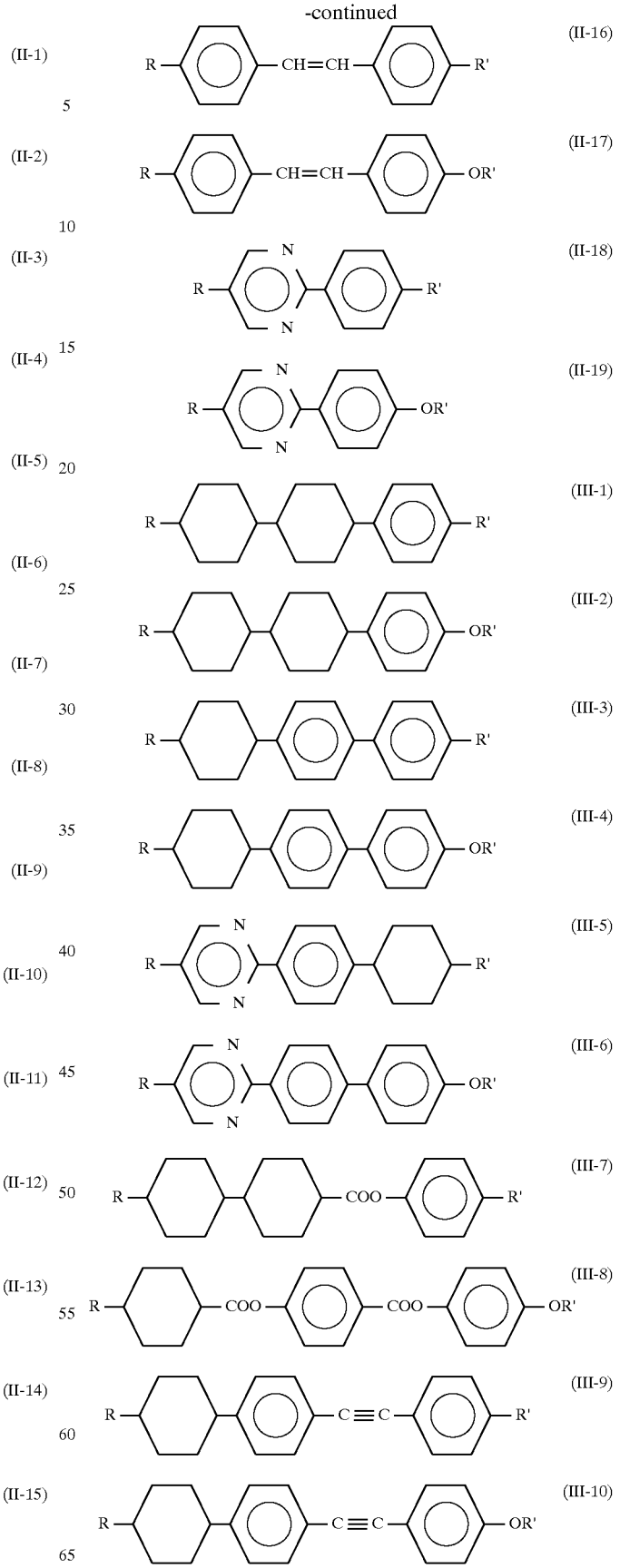

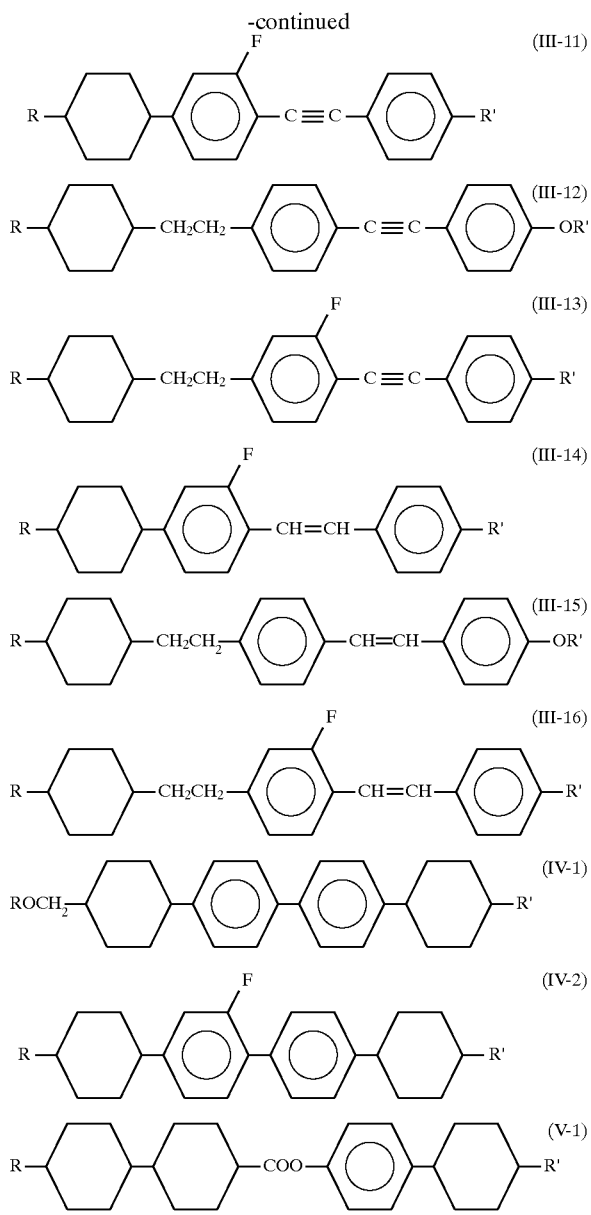

In these formulas, R and R' each independently represent an alkyl group or an alkenyl group.

Among these compounds, particularly those expressed by the formulas (II-1), (II-2), (II-4), (II-5), (II-6), (II-7), (II-8), (II-13), (II-14), (II-18), (II-19), (III-1), (III-2), (III-5), (III-9), (III-11), (III-12), (III-14), (III-15), (IV-1) and ( V-1) are preferably used.

The compounds of the second component exhibit a negative or weakly positive $\Delta\epsilon$.

Among these compounds, those expressed by the formula (II) are used mainly for reducing the viscosity of the liquid crystal composition and/or adjusting its $\Delta n$. Further, compounds expressed by the formulas (III) to (V) are used for broadening the nematic range such as elevating the clearing point of the liquid crystal composition, and/or for adjusting $\Delta n$ and viscosity.

The content of the second component is 5 to 80% by weight, preferably 10 to 60% by weight based upon the total weight of the liquid crystal composition. If the content is less than 5% by weight, the viscosity of the liquid crystal composition becomes high, and on the contrary, if it exceeds 60% by weight, the threshold voltage ($V_{10}$) becomes high.

The third component used in the liquid crystal composition of the present invention is cholesteryl nonanoate expressed by the above formula (X) (hereinafter referred to as CN) which is an optically active compound, and it is used for adjusting the pitch length of twist of the liquid crystal composition.

This third component has been known to afford a broad d/P margin differently from other optically active compounds (e.g. S-811 made by Merck Corporation), but the reason is not always clarified.

In connection with this, when the same chiral nematic liquid crystal composition is used in a liquid crystal display element, but the aligned membrane is changed to that having a higher pretilt, it has been known that d/P margin of the display element is broadened along with the above change.

In view of this fact, the following interpretation is made:

in the chiral nematic composition using CN, its pretilt angle becomes larger due to the particular structure of CN, whereby the effectiveness that d/P margin is broadened, is exhibited.

The content of the third component is preferred to be a quantity corresponding to that necessary for retaining the d/P value within a range of 0.3 to 0.65. If the d/P value is less than 0.3, a low dimensional domain occurs, and if it exceeds 0.65, stripe domain occurs.

The above corresponding quantity is not always alike, depending upon the kind of the liquid crystal composition constituting its base, but it is generally 1.0 to 3.0 parts by weight, preferably 1.2 to 2.7 parts by weight, based upon 100 parts by weight of the base liquid crystal composition.

As preferable examples of the fourth component further used in the liquid crystal composition of the present invention, compounds expressed by the formulas (VI-1) to (VI-3) as regards the formula (VI), and the formulas (VII-1) to (VII-20) as regards the formula (VII) can be mentioned:

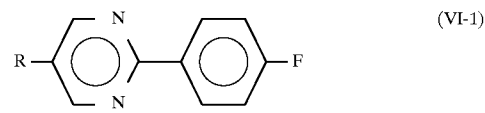
(VI-1)

(VI-2)

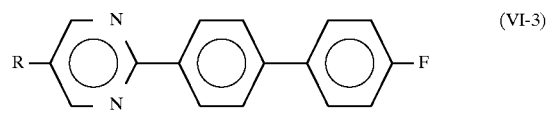
(VI-3)

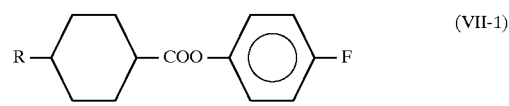
(VII-1)

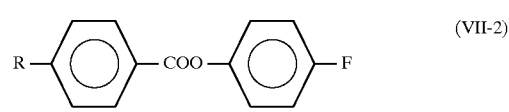
(VII-2)

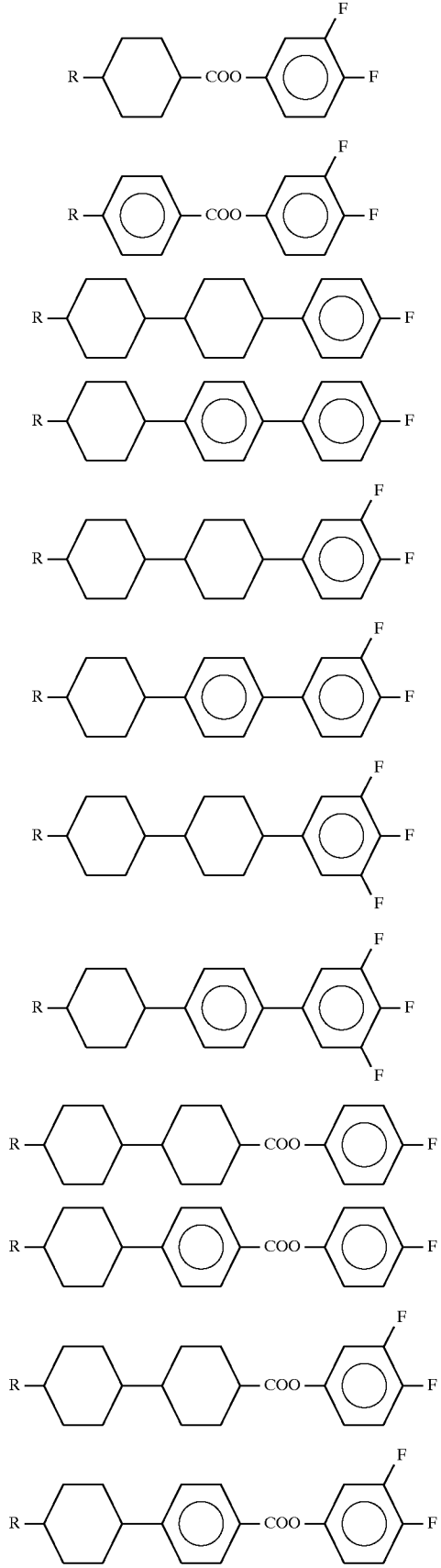
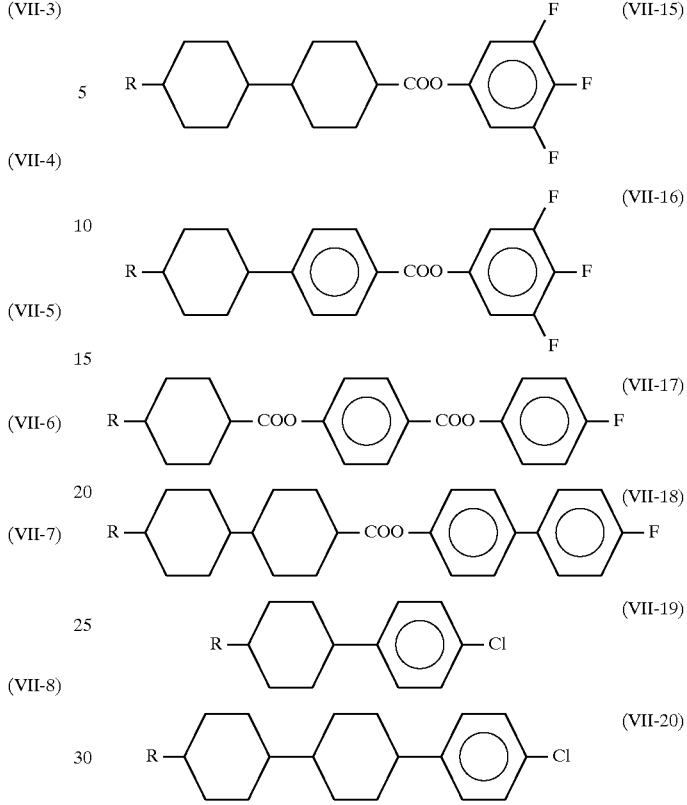

In these formulas, R represents an alkyl group of 1 to 10 carbon atoms.

Among the compounds of the above formulas, particularly those expressed by the formulas (VI-1), (VI-2), (VI-3), (VII-1), (VII-5), (VII-6), (VII-7), (VII-8), (VII-9), (VII-10), (VII-11), (VII-12), VII-13), (VII-14), (VII-15), (VII-16), (VII-18), (VII-19) and (VII-20) are preferably used.

The compounds of the fourth component exhibit a positive $\Delta\epsilon$, and are used particularly for reducing $V_{10}$ and improving its temperature-dependency. Further, they are also used for viscosity adjustment, $\Delta n$ adjustment and broadening the nematic range by elevation of clearing point, etc.

The content of the fourth component is 50% by weight or less, preferably 40% by weight or less, based upon the total weight of the liquid crystal composition.

The liquid crystal composition of the present invention may further contain a suitable quantity of other compounds in addition to the first to the fourth components, for adjusting various characteristics requested for the liquid crystal composition, such as adjustments of the threshold voltage ($V_{10}$), nematic range, $\Delta n$, $\Delta\epsilon$, viscosity, etc.

The liquid crystal composition of the present invention can be prepared according to a process which is conventional by itself, for example, according to a process of dissolving various components with each other at a high temperature, a process of dissolving the respective components in an organic solvent, and mixing, followed by distilling off the solvent under reduced pressure, or the like process.

Further, if necessary, a suitable additive is added, whereby an improvement corresponding to this object use applications is made and the composition is optimized. Such additives have been known to person of the skill in art and described in literatures in detail.

Further, when a dichroic pigment such as those of mellocyanine group, styryl group, azo group, azomethine group, azoxy group, quinophthalone group, anthraquinone group, tetrazine group, etc. is added, the resulting composition is also usable for guest-host (GH) mode.

The liquid crystal composition is also usable for polymer dispersion type liquid crystal display element, represented by NCAP prepared by microcapsulating nematic liquid crystals, and a polymer network liquid crystal display element obtained by forming three-dimensional, reticular high polymer in liquid crystals (PDLCD), and besides, it is usable as liquid crystal composition for birefringence-control (ECB) mode and for dynamic scattering (DS) mode.

EXAMPLES

The present invention will be described by way of Examples in more detail, but it should not be construed to be restricted thereto.

In the compositions shown in the respective Examples and Comparative examples, the designations of compounds were carried out in accordance with the definitions shown in the below Table 1, and by corresponding the groups shown in the respective columns of left terminal group, bonding group, ring structure and right terminal group, to those shown in the symbols, The contents of the respective compounds mean % by weight, unless otherwise indicated.

The data of the liquid crystal composition were shown by TNI (clearing point), TSN (smectic-nematic phase transition point), viscosity (20° C.), Δn (optical anisotropy at 25° C.), Δε (dielectric anisotropy at 25° C.), $V_{10}$ (voltage at the time of a transmittance of 10%) and Δ (d/P).

In addition, the above Δ (d/P) refers to a d/P value in the range where low dimensional domain and stripe domain do not occur, that is, d/P margin, and it is evaluated by filling a nematic liquid crystal composition prepared at the former step of the respective examples in an STN cell of a twist angle of 240° and a thickness d=5.8 to 6.2 μm, adding a chiral component gradually by 0.01 part by weight to 100 parts by weight of the composition, and evaluating by observation of the domain at that time.

TABLE 1

$R-(A_1)-Z_1- \ldots -Z_n-(A_n)-X$

| 1) Left terminal group $R_1$ | Symbol |
|---|---|
| $C_nH_{2n+1}-$ | n- |
| $C_nH_{2n+1}O-$ | nO- |
| $C_nH_{2n+1}OC_mH_{2m}-$ | nOm- |
| $CH_2=CH-$ | V- |
| $CH_2=CHC_nH_{2n}-$ | Vn- |
| $C_nH_{2n+1}CH=CHC_mH_{2m}-$ | nVm- |
| $C_nH_{2n+1}CH=CHC_mH_{2m}CH=CHC_kH_{2k}-$ | nVmVk- |

| 2) Ring structure $-(A_1)-$, $-(A_n)-$ | Symbol |
|---|---|
|  | B |
| 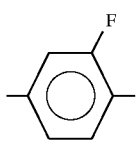 | B(F) |

TABLE 1-continued $R-(A_1)-Z_1- \ldots -Z_n-(A_n)-X$

| | Symbol |
|---|---|
| (difluorophenyl ring) | B(F,F) |
| (cyclohexyl ring) | H |
| (pyrimidine ring) | Py |
| (dioxane ring) | D |
| (cyclohexene ring) | Ch |

| 3) Bonding group $-Z_1-$, $-Z_n-$ | Symbol |
|---|---|
| $-C_2H_4-$ | 2 |
| $-C_4H_3-$ | 4 |
| $-COO-$ | E |
| $-C\equiv C-$ | T |
| $-CH=CH-$ | V |
| $-CF_2O-$ | CF2O |
| $-OCF_2-$ | OCF2 |

| 4) Right terminal group $-X$ | Symbol |
|---|---|
| $-F$ | -F |
| $-Cl$ | -CL |
| $-CN$ | -C |
| $-CF_3$ | -CF3 |
| $-OCF_3$ | -OCF3 |
| $-OCF_2H$ | -OCF2H |
| $-C_nH_{2n+1}$ | -n |
| $-OC_nH_{2n+1}$ | -On |
| $-COOCH_3$ | -EMe |
| $-C_nH_{2n}CH=CH_2$ | -nV |
| $-C_mH_{2m}CH=CHC_nH_{2n+1}$ | -mVn |

5) Designation example

Ex. 1 3-H2B(F,F)B(F)-F

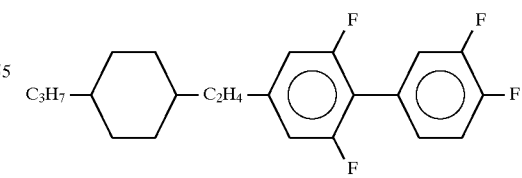

Ex. 2 3-HB(F)TB-2

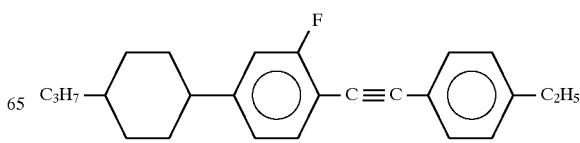

TABLE 1-continued $$R-(A_1)-Z_1-\ldots-Z_n-(A_n)-X$$

Ex. 3 1V2-BEB(F,F)-C

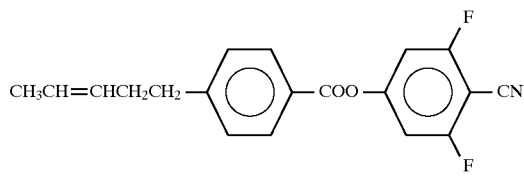

Comparative example 1

A nematic liquid crystal composition consisting of the following compound contents was prepared:

| | |
|---|---|
| V2-HB-C | 12.0% |
| 1V2-HB-C | 12.0% |
| 3-HB-C | 8.0% |
| 2-HHB-C | 6.0% |
| 3-HHB-C | 6.0% |
| 4-HHB-C | 6.0% |
| 5-HHB-C | 6.0% |
| 3-HB-O2 | 12.0% |
| 3-HH-4 | 11.0% |
| 3-H2BTB-2 | 5.0% |
| 3-H2BTB-3 | 4.0% |
| 3-H2BTB-4 | 4.0% |
| 3-HB (F) TB-2 | 8.0% |

The characteristics of this nematic liquid crystal composition were sought. The results were as follows:

TNI=114.1° C.
TSN>−30° C.
$\eta$=21.9 mPa.s ($\eta$; viscosity)
$\Delta n$=0.145
$\Delta\epsilon$=7.1
$V_{10}$=2.42 V To this nematic liquid crystal composition (100 parts by weight) was added gradually from 0.92 parts to 1.02 parts by weight of p-(p-n-hexylbenzoyloxy)benzoic acid-2-octyl ester (made by Merck Corporation, tradename: S-811) as a chiral component (optically active compound), followed by domain-observing, to give $\Delta(d/P)$=0.017.

Example 1

A chiral component was added gradually in the same manner as in Comparative example 1 except that the above-mentioned CN was used from 2.14 parts to 2.59 parts in place of S-811, followed by domain observation of the resulting liquid crystal composition in the same manner. As a result, $\Delta(d/P)$=0.049. It is known that this value is far larger than that of Comparative example 1.

Comparative example 2

A nematic liquid crystal composition consisting of the following compound contents was prepared:

| | |
|---|---|
| 1V2-BEB (F, F) - C | 7.0% |
| 3O1-BEB (F) - C | 5.0% |
| 3-HB-C | 14.0% |
| 3-HB-O2 | 11.0% |
| 3-HH-4 | 11.0% |
| 3-HHB-1 | 10.0% |
| 3-HHB-O1 | 4.0% |
| 3-HHB-F | 4.0% |
| 3-HHB-3 | 15.0% |
| 3-HB (F) TB-2 | 4.0% |
| 3-HB (F) TB-2 | 3.0% |
| 3-H2BTB-2 | 4.0% |
| 3-H2BTB-3 | 4.0% |
| 3-H2BTB-4 | 4.0% |

The characteristics of this nematic liquid crystal composition were sought. The results were as follows:

TNI=103.5° C.
TSN>−30° C.
$\eta$=17.9 mPa.s
$\Delta n$=0.130
$\Delta\epsilon$=8.1
$V_{10}$=2.05 V To this nematic liquid crystal composition (100 parts by weight) was added gradually from 0.74 parts to 0.87 parts by weight of the above S-811 made by Merck Corporation as a chiral component, followed domain observation of the resulting liquid crystal composition, to give $\Delta(d/P)$=0.08.

Example 2

A chiral component was added gradually in the same manner as in Comparative example 2 except that the above CN was used from 1.43 parts to 2.01 parts in place of S-811, followed by domain observation of the resulting liquid crystal composition, to give $\Delta(d/P)$=0.120. This value is known to be far larger than that of Comparative example 2.

Comparative example 3

A nematic liquid crystal composition consisting of the following compound contents was prepared:

| | |
|---|---|
| V2-HB-C | 10.0% |
| 1V2-BH-C | 10.0% |
| 3-HB-C | 22.0% |
| 3-HB (F) -C | 5.0% |
| 3-HH-4 | 4.0% |
| 3-HHE-F | 4.0% |
| 5-HHE-F | 4.0% |
| 3-HHB-1 | 10.0% |
| 3-HHB-O1 | 5.0% |
| 3-HHB-3 | 14.0% |
| 3-HHB-F | 5.0% |
| 3-H2BTB-2 | 3.0% |
| 3-H2BTB-3 | 4.0% |

The characteristics of this nematic liquid crystal composition were sought. The results were as follows:

TNI=103.1° C.
TSN>−30° C.
$\eta n$=20.6 mPa.s
$\Delta n$=0.122
$\Delta\epsilon$7.4
$V_{10}$=2.25 V To this nematic liquid crystal composition (100 parts by weight) was added gradually from 0.64 parts to 0.73 parts of the above S-811 made by Merck Corporation as a chiral component, followed by domain-observation of the resulting liquid crystal composition, to give $\Delta(d/P)$=0.010.

Example 3

A chiral component was added in the same manner as in Comparative example 3 except that the above CN was used from 1.87 parts to 2.18 parts in place of S-811, followed by domain observation of the resulting liquid crystal composition, to give $\Delta(d/P)=0.020$. This value is known to be far larger than that of Comparative example 3.

Example 4

A nematic liquid crystal composition consisting the following compound contents was prepared:

| | |
|---|---|
| 3-HB-C | 3.0% |
| 3-HB (F) -C | 13.0% |
| 3O1-BEB (F) -C | 13.0% |
| 2-BB-C | 6.0% |
| 5-BB-C | 5.0% |
| 3-HHB (F) -C | 5.0% |
| 3-PyBB-F | 11.0% |
| 4-PyBB-F | 10.0% |
| 5-PyBB-F | 10.0% |
| 3-H2BTB-2 | 4.0% |
| 3-H2BTB-3 | 4.0% |
| 3-H2BTB-4 | 4.0% |
| 3-HB (F) TB-2 | 6.0% |
| 3-HB (F) TB-3 | 6.0% |

The characteristics of this nematic liquid crystal composition were sought. The results were as follows:

TNI=105.4° C.
TSN>−30° C.
η=54.2 mPa.s
Δn=0.217
Δε17.0
$V_{10}$=1.41 V

To this nematic liquid crystal composition was added the above CN as a chiral component as in Example 1, followed by domain observation of the resulting liquid crystal composition, to give a $\Delta(d/P)=0.0480$.

Example 5

A nematic liquid crystal composition consisting of the following compound components was prepared:

| | |
|---|---|
| V2-HB-C | 3.0% |
| 1V2-HB-C | 13.0% |
| 2-BEB-C | 12.0% |
| 3-BEB-C | 8.0% |
| 2-BTB-O1 | 8.0% |
| 3-BTB-O1 | 7.0% |
| 4-BTB-O1 | 7.0% |
| 1-BTB-3 | 13.0% |
| 3-H2BTB-2 | 5.0% |
| 3-H2BTB-3 | 4.0% |
| 3-H2BTB-4 | 4.0% |
| 3-HB (F) TB-2 | 8.0% |
| 3-HB (F) TB-3 | 8.0% |

The characteristics of this nematic liquid crystal composition were sought. Thie results were as follows:

TNI=79.5° C.
TSN>−20° C.
η=23.8 mPa.s
Δn=0.222
Δε9.0
$V_{10}$=1. 69 V

To this nematic liquid crystal composition was added the above CN as a chiral component as in Example 1, followed by domain observation, to give a $\Delta(d/P)=0.041$.

Example 6

A nematic liquid crystal composition consisting of the following compound components was prepared:

| | |
|---|---|
| V2-HB-C | 10.0% |
| 1V2-HB-C | 10.0% |
| 3-HB-C | 21.0% |
| 5-HB-C | 12.0% |
| 2-BTB-O1 | 4.0% |
| 2-PyB-2 | 4.0% |
| 2-PyB-3 | 3.0% |
| 3-HH-4 | 8.0% |
| 3-HHB-1 | 6.0% |
| 3-HHB-3 | 6.0% |
| 3-H2BTB-2 | 3.0% |
| 3-H2BTB-3 | 3.0% |
| 2-PyBH-3 | 4.0% |
| 3-PyBH-3 | 3.0% |
| 3-PyBB-F | 3.0% |

The characteristics of this nematic liquid crystal composition were sought. The results were as follows:

TNI=77.1° C.
TSN>−30° C.
η=18.7 mPa.s
Δn=0.140
Δε=8.0
$V_{10}$=1.78 V

To this nematic liquid crystal composition was added the above CN as a chiral component as in Example 1, followed by domain observation of the resulting liquid crystal composition, to give a $\Delta(d/P)=0.039$.

Example 7

A nematic liquid crystal composition consisting of the following compound contents was prepared:

| | |
|---|---|
| 101-HB-C | 10.0% |
| 201-HB-C | 8.0% |
| 3-HB-C | 8.0% |
| 3-HB (F) B-C | 5.0% |
| 3-HHB-C | 7.0% |
| 101-HH-3 | 3.0% |
| 101-HH-5 | 9.0% |
| 2-BTB-O1 | 3.2% |
| 3-BTB-O1 | 3.2% |
| 4-BTB-O1 | 3.2% |
| 4-BTB-O2 | 3.2% |
| 5-BTB-O1 | 3.2% |
| 2-HHB (F) -F | 10.0% |
| 3-HHB (F) -F | 7.0% |
| 5-HHB (F) -F | 7.0% |
| 3-HHB-1 | 7.0% |
| 3-HHB-O1 | 3.0% |

The characteristics of this nematic liquid crystal composition were sought. The results were as follows:

TNI=75 7° C.
TSN>−20° C.
η=21.5 mPa.s
Δn=0.123
Δε=8.2
$V_{10}$=1.66 V

To this nematic liquid crystal composition was added the above CN as a chiral component as in Example 1, followed by domain observation of the resulting liquid crystal composition, to give a $\Delta(d/P)=0.037$.

Example 8

A nematic liquid crystal composition consisting of the following compound contents was prepared:

| | |
|---|---|
| 3O1-BEB (F) -C | 11.0% |
| V2-HB-C | 11.0% |
| 3-HB-O2 | 3.0% |
| 2-BTB-O1 | 6.8% |
| 3-BTB-O1 | 6.8% |
| 4-BTB-O1 | 6.8% |
| 4-BTB-O2 | 6.8% |
| 5-BTB-O1 | 6.8% |
| 3-HHB-O1 | 3.0% |
| 3-H2BTB-2 | 2.0% |
| 3-H2BTB-3 | 3.0% |
| 3-H2BTB-4 | 3.0% |
| 3-HB (F) TB-2 | 6.0% |
| 3-HB (F) TB-3 | 6.0% |
| 3-HB (F) TB-4 | 6.0% |
| 2-PyBH-3 | 4.0% |
| 3-PyBH-3 | 4.0% |
| 3-PyBB-2 | 4.0% |

The characteristics of this nematic liquid crystal composition were sought. The results were as follows:

TNI=96.5° C.
TSN>−30° C.
$\eta$=30.2 mPa.s
$\Delta n$=0.220
$\Delta\epsilon$=7.6
$V_{10}$=2.08 V To this nematic liquid crystal composition was added the above CN as a chiral component as in Example 1, followed by domain observation of the resulting liquid crystal composition, to give a $\Delta(d/P)=0.062$.

Example 9

A nematic liquid crystal composition consisting of the following compound contents was prepared:

| | |
|---|---|
| V2-HB-C | 9.0% |
| 1V2-HB-C | 9.0% |
| 3-HB-C | 14.0% |
| 1O1-HB-C | 8.0% |
| 2O1-HB-C | 4.0% |
| 2-HHB-C | 5.0% |
| 3-HHB-C | 5.0% |
| 3-HH-4 | 10.0% |
| 1O1-HH-5 | 8.0% |
| 2-BTB-O1 | 11.0% |
| 3-HHB-1 | 8.0% |
| 3-HHB-3 | 9.0% |

The characteristics of this nematic liquid crystal composition were sought. The results were as follows:

TNI=80.0° C.
TSN>−30° C.
$\eta$=18.8 mPa.s
$\Delta n$=0.126
$\Delta\epsilon$=9.0
$V_{10}$=1.89 V To this nematic liquid crystal composition was added the above CN as a chiral component as in Example 1, followed by domain observation of the resulting liquid crystal composition, to give a $\Delta(d/P)=0.026$.

Example 10

A nematic liquid crystal composition consisting of the following compound contents was prepared:

| | |
|---|---|
| 1V2-BEB (F, F) -C | 12.0% |
| 3O1-BEB (F) -C | 12.0% |
| 2-HB-C | 12.0% |
| 3-HB-C | 19.0% |
| 2-HHB-C | 4.0% |
| 3-HHB-C | 5.0% |
| 4-HHB-C | 4.0% |
| 5-HHB-C | 4.0% |
| 3-HB-O2 | 7.0% |
| 3-HHB-1 | 7.0% |
| 3-HHB-O1 | 4.0% |
| 3-H2BTB-2 | 4.0% |
| 3-H2BTB-3 | 3.0% |
| 3-H2BTB-4 | 3.0% |

The characteristics of this nematic liquid crystal composition were sought. The results were as follows:

TNI=82.1° C.
TSN>−20° C.
$\eta$=30.5 mPa.s
$\Delta n$=0.142
$\Delta\epsilon$=19.3
$V_{10}$=1.19 V To this nematic liquid crystal composition was added the above CN as a chiral component as in Example 1, to give a $\Delta(d/P)=0.055$.

Example 11

A nematic liquid crystal composition consisting of the following compound contents was prepared:

| | |
|---|---|
| V2-HB-C | 12.0% |
| 1V2-HB-C | 11.0% |
| 1V2-BEB (F, F) -C | 11.0% |
| 2-BTB-1 | 8.0% |
| 4-BTB-O2 | 8.0% |
| 5-BTB-O1 | 6.0% |
| 3-HH-4 | 3.0% |
| 3-HH-EMe | 3.0% |
| 3-H2BTB-2 | 4.0% |
| 3-H2BTB-3 | 4.0% |
| 3-H2BTB-4 | 4.0% |
| 2-H2BTB-3 | 4.0% |
| 2-H2BTB-2 | 4.0% |
| 3-HB (F) TB-2 | 6.0% |
| 3-HB (F) TB-3 | 6.0% |
| 3-HB (F) TB-4 | 6.0% |

The characteristics of this nematic liquid crystal composition were sought. The results were as follows:

TNI=87.5° C.
TSN>−30° C.
$\eta$=22.4 mPa.s
$\Delta n$=0.201
$\Delta\epsilon$=9.6
$V_{10}$1.74 V To this nematic liquid crystal composition was added the above CN as a chiral component as in Example 1, followed by observation of the resulting liquid crystal composition, to give a $\Delta(d/P)=0.044$.

Example 12

A nematic liquid crystal composition consisting of the following compound contents was prepared:

| | |
|---|---|
| 2O1-BEB (F) -C | 4.0% |
| 3O1-BEB (F) -C | 12.0% |
| 5O1-BEB (F) -C | 4.0% |
| 1V2-BEB (F, F) -C | 15.0% |
| 3-HHEB-F | 5.0% |
| 5-HHEB-F | 5.0% |
| 3-HBEB-F | 6.0% |
| 3-HHB-F | 3.0% |
| 3-HB-O2 | 10.0% |
| 3-HH-4 | 5.0% |
| 3-HHB-1 | 8.0% |
| 3-HHB-3 | 6.0% |
| 3-HHB-O1 | 4.0% |
| 3-H2BTB-2 | 4.0% |
| 3-H2BTB-3 | 4.0% |
| 3-HB (F) TB-2 | 5.0% |

The characteristics of this nematic liquid crystal composition were sought. The results were as follows:

TNI=92.5° C.

TSN>−30° C.

$\eta$=35.9 mPa.s $\Delta n$=0.136

$\Delta \epsilon$=23.5

$V_{10}$ 1.10 V

To this nematic liquid crystal composition was added the above CN as a chiral component as in Example 1, followed by domain observation, to give a $\Delta(d/P)$=0.053.

Example 13

A nematic liquid crystal composition consisting of the following compound contents was prepared:

| | |
|---|---|
| 2-HB (F) -C | 15.0% |
| 3-HB (F) -C | 15.0% |
| 3-HHB-F | 4.0% |
| 3-HB-O2 | 10.0% |
| 3-HH-4 | 10.0% |
| 2-BTB-O1 | 10.0% |
| 3-HHB-1 | 8.0% |
| 3-HHB-3 | 16.0% |
| 3-HHB-O1 | 4.0% |
| 3-H2BTB-2 | 4.0% |
| 3-H2BTB-3 | 4.0% |

The characteristics of this nematic liquid crystal composition were sought. The results were as follows:

TNI=71.9° C.

TSN>−30° C.

$\eta$=15.7 mPa.s $\Delta n$=0.118

$\Delta \epsilon$=6.6

$V_{10}$=1.81 V

To this nematic liquid crystal composition was added the above CN as a chiral component as in Example 1, followed by domain observation of the resulting liquid crystal composition, to give a $\Delta(d/P)$=0.036.

Example 14

A nematic liquid crystal composition consisting of the following compound contents was prepared:

| | |
|---|---|
| 2-HB (F) -C | 15.0% |
| 2-HEB-F | 2.4% |
| 3-HEB-F | 2.3% |
| 4-HEB-F | 2.3% |
| 3-HHEB-F | 5.0% |
| 5-HHEB-F | 5.0% |
| 2-HHB (F) -C | 13.0% |
| 3-HHB (F) -C | 13.0% |
| 2-HHB (F) -F | 14.0% |
| 3-HHB (F) -F | 14.0% |
| 5-HHB (F) -F | 14.0% |

The characteristics of this nematic liquid crystal composition were sought. The results were as follows:

TNI=101.4° C.

TSN>−20° C.

$\eta$=35.6 mPa.s $\Delta n$=0.095

$\Delta \epsilon$=24.8

$V_{10}$ 1.15 V

To this nematic liquid crystal composition was added the above CN as a chiral component as in Example 1, followed by domain observation of the resulting liquid crystal composition, to give a $\Delta(d/P)$=0.066.

Example 15

A nematic liquid crystal composition consisting of the following compound contents was prepared:

| | |
|---|---|
| 2-HB (F) -C | 14.0% |
| 3-HB (F) -C | 13.0% |
| 5-HB(F) -C | 9.0% |
| 2-BB-C | 13.0% |
| 2-BEB-C | 12.0% |
| 3-BEB-C | 4.0% |
| 2-HHB (F) -C | 9.0% |
| 3-HHB (F) -C | 12.0% |
| 2-HHB-C | 3.0% |
| 3-HHB-C | 3.0% |
| 3-PyBB-F | 8.0% |

The characteristics of this nematic liquid crystal composition were sought. The results were as follows:

TNI=65.8° C.

TSN>−20° C.

$\eta$=52.3 mPa.s $\Delta n$=0.150

$\Delta \epsilon$=19.1

$V_{10}$=1.01 V

To this nematic liquid crystal composition was added the above CN as a chiral component as in Example 1, followed by domain observation, to give a $\Delta(d/P)$=0.038.

Example 16

A nematic liquid crystal composition consisting of the following compound contents was prepared:

| | |
|---|---|
| 3-HB(F)-C | 3.0% |
| 3-HB-C | 21.0% |
| 3-HHB-C | 5.0% |
| 5-PyB-F | 10.0% |
| 3-HB-O2 | 4.0% |
| 2-BTB-1 | 6.0% |

-continued

| | |
|---|---|
| 3-HH-4 | 9.0% |
| 3-HH-5 | 11.0% |
| 3-HHB-1 | 10.0% |
| 3-HHB-3 | 14.0% |
| 3-HHB-O1 | 3.0% |
| 3-HEBEB-2 | 2.0% |
| 3-HEBEB-F | 2.0% |

The characteristics of this nematic liquid crystal composition were sought. The results were as follows:

TNI=81.7° C.

TSN>−30° C.

η=13.8 mPa.s

Δn=0.114

Δε=5.4

$V_{10}$=2.19 V

To this nematic liquid crystal composition was added the above CN as a chiral component as in Example 1, followed by domain observation of the resulting liquid crystal composition, to give a Δ(d/P)=0.047.

Example 17

A nematic liquid crystal composition consisting of the following compound contents was prepared:

| | |
|---|---|
| 2-BB-C | 8.0% |
| 4-BB-C | 6.0% |
| 2-HB-C | 10.0% |
| 3-HB-C | 13.0% |
| 3-HHB-F | 5.0% |
| 2-HHB-C | 4.0% |
| 3-HHB-C | 6.0% |
| 5-PyB-F | 6.0% |
| 3-PyBB-F | 6.0% |
| 2-BTB-O1 | 2.0% |
| 2-HHB-1 | 6.0% |
| 3-HHB-1 | 8.0% |
| 3-HHB-3 | 15.0% |
| 3-HHB-O1 | 5.0% |

The characteristics of this nematic liquid crystal composition were sought. The results were as follows:

TNI=99.4° C.

TSN>−30° C.

η=22.3 mPa.s

Δn=0.144

Δε=8.7

$V_{10}$=1.89 V

To this nematic liquid crystal composition was added the above CN as a chiral component as in Example 1, followed by domain observation of the resulting liquid crystal composition, to give a Δ(d/P)=0.029.

Example 18

A nematic liquid crystal composition consisting of the following compound contents was prepared:

| | |
|---|---|
| 5-BB-C | 7.0% |
| 3-HHB-F | 4.0% |
| 3-HB-O2 | 14.0% |
| 3-HB-O4 | 13.0% |
| 3-PyB-4 | 3.1% |
| 4-PyB-4 | 3.1% |
| 6-PyB-4 | 3.2% |
| 3-PyB-5 | 3.2% |
| 4-PyB-5 | 3.2% |
| 6-PyB-5 | 3.2% |
| 6-PyB-O5 | 4.0% |
| 6-PyB-O6 | 4.0% |
| 6-PyB-O7 | 4.0% |
| 6-PyB-O8 | 4.0% |
| 2-HHB-1 | 4.0% |
| 3-HHB-1 | 8.0% |
| 3-HHB-3 | 10.0% |
| 3-HHB-O1 | 5.0% |

The characteristics of this nematic liquid crystal composition were sought. The results were as follows:

TNI=65.0° C.

TSN>−20° C.

η=28.1 mPa.s

Δn=0.121

Δε=3.2

$V_{10}$=3.21 V

To this nematic liquid crystal composition was added the above CN as a chiral component as in Example 1, followed by domain observation, to give a Δ(d/P)=0.023.

Example 19

A nematic liquid crystal composition consisting of the following compound contents was prepared:

| | |
|---|---|
| 3-DB-C | 10.0% |
| 4-DB-C | 12.0% |
| 5-DB-C | 8.0% |
| 2-BEB-C | 10.0% |
| 5-PyB(F)-F | 10.0% |
| 2-PyB-2 | 1.4% |
| 3-PyB-2 | 1.3% |
| 4-PyB-2 | 1.3% |
| 3-HEB-O4 | 5.0% |
| 4-HEB-O2 | 3.7% |
| 3-HEB-O2 | 3.1% |
| 1O-BEB-2 | 2.5% |
| 5-HEB-1 | 3.7% |
| 4-HEB-4 | 5.0% |
| 3-HHB-3 | 13.0% |
| 3-HHB-O1 | 4.0% |
| 2-PyBH-3 | 6.0% |

The characteristics of this nematic liquid crystal composition were sought. The results were as follows:

TNI=75.7° C.

TSN>−20° C.

η=21.5 mPa.s

Δn=0.123

Δε=8.2

$V_{10}$1.66 V

To this nematic liquid crystal composition was added the above CN as a chiral component as in Example 1, followed by domain observation of the resulting liquid crystal composition, to give a Δ(d/P)=0.056.

Example 20

A nematic liquid crystal composition consisting of the following compound contents was prepared:

| | |
|---|---|
| 3-DB-C | 10.0% |
| 4-DB-C | 10.0% |
| 2-BEB-C | 12.0% |
| 3-BEB-C | 4.0% |
| 3-HHEBB-C | 3.0% |
| 3-HBEBB-C | 3.0% |
| 5-HBEBB-C | 3.0% |
| 3-PyB(F)-F | 6.0% |
| 3-HEB-O4 | 11.9% |
| 4-HEB-O2 | 8.9% |
| 5-HEB-O1 | 8.9% |
| 3-HEB-O2 | 7.4% |
| 5-HEB-O2 | 5.9% |
| 3-HHB-1 | 6.0% |

The characteristics of this nematic liquid crystal composition were sought. The results were as follows:

TNI=76.0° C.
TSN>−20° C.
η=39.6 mPa.s
Δn=0.128
Δε=16.2
$V_{10}$=1.42 V

To this nematic liquid crystal composition was added the above CN as a chiral component as in Example 1, followed by domain observation of the resulting liquid crystal composition, to give a Δ(d/P)=0.048.

Example 21

A nematic liquid crystal composition consisting of the following compound contents was prepared:

| | |
|---|---|
| 3-HB-C | 13.0% |
| 5-HB-C | 13.0% |
| 3-HHB-1 | 7.0% |
| 3-HHB-O1 | 3.0% |
| 3-HHB-CL | 4.0% |
| 3-H2BTB-2 | 4.0% |
| 3-H2BTB-3 | 3.0% |
| 2-HHB(F)-F | 7.0% |
| 3-HHB(F)-F | 7.0% |
| 5-HHB(F)-F | 7.0% |
| 2-HBB(F)-F | 4.0% |
| 3-HBB(F)-F | 4.0% |
| 5-HBB(F)-F | 4.0% |
| 3-HHB-O2 | 10.0% |
| 2-HHEBB-F | 5.0% |
| 3-HHEBB-F | 5.0% |

The characteristics of this nematic liquid crystal composition were sought. The results were as follows:

TNI=112.7° C.
TSN>−20° C.
η=24.0 mPa.s
Δn=0.123
Δε=5.8
$V_{10}$=2.40 V

To this nematic liquid crystal composition was added the above CN as a chiral component as in Example 1, followed by domain observation, to give a Δ(d/P)=0.049.

Example 22

A nematic liquid crystal composition consisting of the following compound contents was prepared:

| | |
|---|---|
| 3-HB-C | 10.0% |
| 4-HB-C | 3.0% |
| 5-BB-2 | 2.0% |
| 2-BTB-1 | 10.0% |
| 2-BTB-3 | 10.0% |
| 3-HH-4 | 10.0% |
| 3-HB-02 | 10.0% |
| 3-HHB-3 | 10.0% |
| 3-HHEB(F)-F | 10.0% |
| 3-HBEB(F,F)-F | 5.0% |
| 3-HBB(F,F)-F | 5.0% |
| 2-H2BB(F,F)-F | 5.0% |
| 3-HB-CL | 5.0% |
| 5-HHB-CL | 5.0% |

The characteristics of this nematic liquid crystal composition were sought. The results were as follows:

TNI=61.2° C.
TSN>−30° C.
η=16.1 mPa.s
Δn=0.131
Δε=4.3
$V_{10}$=2.13 V

To this nematic liquid crystal composition was added the above CN as a chiral component as in Example 1, followed by domain observation, to give a Δ(d/P)=0.035.

As described above, according to the present invention, it is possible to provide a liquid crystal composition having a broad d/P margin, particularly in order to produce an LCD panel having a large size, while satisfying various characteristics.

What is claimed is:

1. A liquid crystal composition which comprises as a first component,
at least one member of compounds expressed by the formulas (I-a) to (I-d):

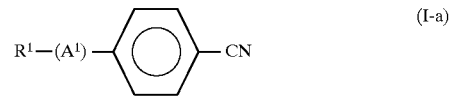

(I-a)

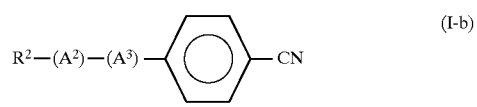

(I-b)

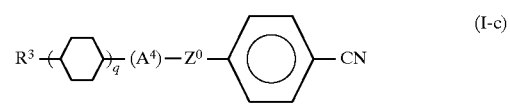

(I-c)

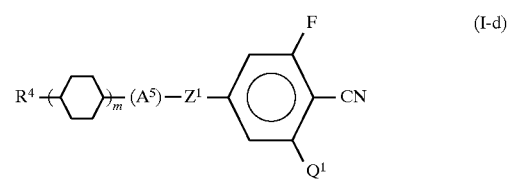

(I-d)

wherein $R^1$, $R^2$, $R^3$ and $R^4$ each independently represent an alkyl group of 1 to 10 carbon atoms, and optionally one or two or more not-adjacent methylene groups (—$CH_2$—) in the group may be replaced by oxygen atom or —CH=CH—; $Z^0$ represents —COO— or —$CH_2CH_2$—; $Z^1$ represents —$CH_2CH_2$—, —COO— or single bond; $Q^1$ represents H or F; $A^1$ represents 1,4-cyclohexylene, 1,4-phenylene, 1,3-dioxane-2,5-diyl or 1,3-pyrimidine-2,5-diyl; $A^2$ and $A^4$ each independently represent 1,4- cyclohexylene or 1,4-phenylene; $A^3$ represents 1,4-cyclohexylene, 1,4-phenylene or 1,3-pyrimidine-2,5-diyl; $A^5$ represents 1,4-cyclohexylene or 1,4-phenylene whose H on the lateral position may be replaced by F; and q and m each independently represent 0 or 1, as a second component, at least one member of compounds expressed by the formulas (II) to (V):

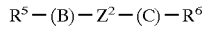  (II)

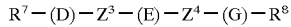  (III)

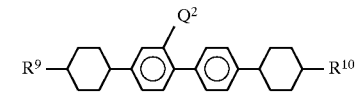  (IV)

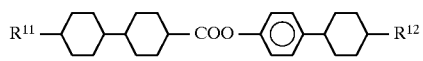  (V)

wherein $R^5$ and $R^6$ each independently represent an alkyl group of 1 to 10 carbon atoms and optionally one or two or more not-adjacent methylene groups (—$CH_2$—) in the group may be replaced by oxygen atom or —CH=CH—;

B represents 1,4-cyclohexylene, 1,4-phenylene or 1,3-pyrimidine-2,5-diyl; C represents 1,4-cyclohexylene or 1,4-phenylene; and $Z^2$ represents —C≡C—, —COO—, —$CH_2CH_2$—, —CH=CH— or single bond, $R^7$ and $R^8$ each independently represent an alkyl group of 1 to 10 carbon atoms and optionally one or two or more not-adjacent methylene groups (—$CH_2$—) in the group may be replaced by oxygen atom (—O—) or —CH=CH—, D represents 1,4-cyclohexylene or 1,3-pyrimidine-2,5-diyl;

E represents 1,4-cyclohexylene or 1,4-phenylene whose one H on the lateral position may be replaced by F;

G represents 1,4-cyclohexylene or 1,4-phenylene;

$Z^3$ represents —$CH_2CH_2$— or single bond; and $Z^4$ represents —C≡C—, —COO—, —CH=CH— or single bond, and $R^9$ to $R^{12}$ each independently represent an alkyl group of 1 to 10 carbon atoms or an alkenyl group of 2 to 10 carbon atoms; and $Q^2$ represents H or F, and as a third component, cholesteryl nonanoate expressed by the formula (X)

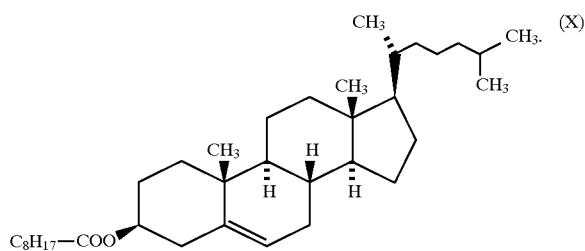  (X)

2. A liquid crystal composition according to claim 1, wherein the first component and the second component are respectively contained in a quantity of 5 to 80% by weight and 5 to 80% by weight based upon the total weight, and the third component is contained in a quantity corresponding to that necessary for retaining a ratio of a cell thickness d ($\mu$m) to a pitch length P ($\mu$m), d/P, in a range of 0.3 to 0.65.

3. A liquid crystal composition according to either one of claim 1 or claim 2, which further contains as a fourth component, at least one member of compounds expressed by the formulas (VI) and/or (VII):

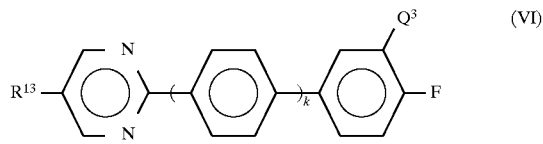  (VI)

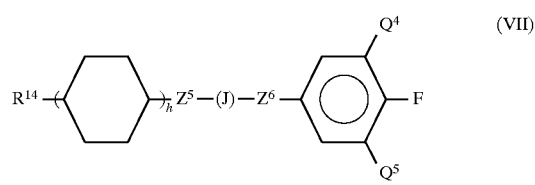  (VII)

wherein $R^{13}$ represents an alkyl group of 1 to 10 carbon atoms or an alkenyl group of 2 to 10 carbon atoms;

$Q^3$ represents H or F; and k represent 0 or 1, and $R^{14}$ represents an alkyl group of 1 to 10 carbon atoms or an alkenyl group of 2 to 10 carbon atoms;

J represents 1,4-cyclohexylene or 1,4-phenylene; $Q^4$ and $Q^5$ each independently represent H or F; $Z^5$ and $Z^6$ each independently represent —COO— or single bond; and h represents 0, 1 or 2.

4. A liquid crystal composition according to claim 3 wherein the fourth component is contained in a quantity of 50% by weight or less, based upon the total weight of the liquid crystal composition.

5. A liquid crystal display element comprising the liquid crystal composition according to claim 1.

6. A liquid crystal display element comprising the liquid crystal composition according to claim 2.

7. A liquid crystal display element comprising the liquid crystal composition according to claim 3.

8. A liquid crystal display element comprising the liquid crystal composition according to claim 4.

* * * * *